US012577120B2

(12) United States Patent (10) Patent No.: US 12,577,120 B2
Ito et al. (45) Date of Patent: Mar. 17, 2026

(54) SYSTEM FOR PRODUCING MAGNESIUM CHLORIDE AND SYSTEM FOR PRODUCING MAGNESIUM

(71) Applicant: MITSUBISHI HEAVY INDUSTRIES, LTD., Tokyo (JP)

(72) Inventors: Yoshiaki Ito, Tokyo (JP); Kazuhisa Takeuchi, Tokyo (JP); Ryo Kamito, Tokyo (JP); Masashi Kiyosawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 921 days.

(21) Appl. No.: 17/790,617

(22) PCT Filed: Dec. 15, 2020

(86) PCT No.: PCT/JP2020/046733
§ 371 (c)(1),
(2) Date: Jul. 1, 2022

(87) PCT Pub. No.: WO2021/140847
PCT Pub. Date: Jul. 15, 2021

(65) Prior Publication Data
US 2023/0045184 A1 Feb. 9, 2023

(30) Foreign Application Priority Data

Jan. 8, 2020 (JP) ................................. 2020-001484

(51) Int. Cl.
*C01F 5/34* (2006.01)
*C02F 1/44* (2023.01)
(Continued)

(52) U.S. Cl.
CPC ................ *C01F 5/34* (2013.01); *C02F 1/441* (2013.01); *C02F 1/4695* (2013.01); *C02F 1/58* (2013.01);
(Continued)

(58) Field of Classification Search
CPC .... C01F 5/34; C01F 5/30; C02F 1/441; C02F 1/4695; C02F 1/58; C02F 2101/101;
(Continued)

(56) References Cited

U.S. PATENT DOCUMENTS 3,980,536 A * 9/1976 Braithwaite .............. C25C 3/04
423/178
5,376,250 A 12/1994 Hamano
(Continued)

FOREIGN PATENT DOCUMENTS

CN 104671260 A 6/2015
JP S48-103098 A 12/1973
(Continued)

OTHER PUBLICATIONS

Komatsu, R., "Smelting of Magnesium", Journal of Japan Institute of Light Metals, 1968, vol. 18, No. 2, pp. 114-123, with partial English translation. (12 pages).
(Continued)

*Primary Examiner* — Bryan D. Ripa
(74) *Attorney, Agent, or Firm* — WHDA, LLP

(57) ABSTRACT

A system for producing magnesium chloride includes a removal unit, and a concentration unit that is connected to the removal unit. The removal unit generates feedstock water by removing sulfate ions and sodium ions from treatment target water having seawater as a feedstock. The concentration unit generates a slurry in which magnesium chloride is crystallized by concentrating the feedstock water. The removal unit has a first removal unit which reduces the (Continued)

sulfate ion concentration compared to the sulfate ion concentration in the treatment target water, and a second removal unit which reduces the sodium ion concentration compared to the sodium ion concentration in the treatment target water.

16 Claims, 6 Drawing Sheets

(51) Int. Cl.

| | |
|---|---|
| *C02F 1/469* | (2023.01) |
| *C02F 1/58* | (2023.01) |
| *C02F 101/10* | (2006.01) |
| *C02F 103/16* | (2006.01) |
| *C25C 3/04* | (2006.01) |

(52) U.S. Cl.
CPC .......... *C25C 3/04* (2013.01); *C02F 2101/101* (2013.01); *C02F 2103/16* (2013.01)

(58) Field of Classification Search
CPC .. C02F 2103/16; C02F 1/442; C02F 2103/08; C02F 2201/46115; C02F 2301/046; C02F 9/00; C25C 3/04; Y02P 10/20; B01D 19/00; B01D 61/02; B01D 61/44; B01D 61/58

See application file for complete search history.

(56) References Cited

U.S. PATENT DOCUMENTS

| | | | | |
|---|---|---|---|---|
| 7,459,088 | B2 * | 12/2008 | Davis ..................... | B01D 61/48 |
| | | | | 204/522 |
| 7,501,064 | B2 * | 3/2009 | Schmidt .................. | C02F 1/469 |
| | | | | 204/522 |
| 10,226,740 | B2 * | 3/2019 | Wallace ............... | B01D 61/027 |
| 2008/0025908 | A1 * | 1/2008 | Chu .......................... | C01F 5/40 |
| | | | | 423/463 |
| 2016/0176728 | A1 * | 6/2016 | Lo ........................... | C02F 1/441 |

FOREIGN PATENT DOCUMENTS

| | | |
|---|---|---|
| JP | S59-184729 A | 10/1984 |
| JP | H06-198141 A | 7/1994 |
| JP | H06-238283 A | 8/1994 |
| JP | 2002-292371 A | 10/2002 |
| JP | 2007-289953 A | 11/2007 |
| JP | 2008-031037 A | 2/2008 |
| JP | 2008-100219 A | 5/2008 |
| JP | 2012-193120 A | 10/2012 |
| JP | 2019-214773 A | 12/2019 |

OTHER PUBLICATIONS

Hashimoto, T., "Processes of Salt manufacture and quality of salts", Nippon Shokuhin Kagaku Kogaku Kaishi, 2002, vol. 49, No. 7, pp. 437-446, with partial English translation. (11 pages).

International Search Report dated Mar. 2, 2021, issued in counterpart International application No. PCT/JP2020/046733, with English translation. (6 pages).

Written Opinion dated Mar. 2, 2021, issued in counterpart International application No. PCT/JP2020/046733, with English translation. (8 pages).

* cited by examiner

FIG. 5

SYSTEM FOR PRODUCING MAGNESIUM CHLORIDE AND SYSTEM FOR PRODUCING MAGNESIUM

TECHNICAL FIELD

The present disclosure relates to a system for producing magnesium chloride and a system for producing magnesium.

The present disclosure claims priority based on Japanese Patent Application No. 2020-001484, filed on Jan. 8, 2020, the content of which is incorporated herein by reference.

BACKGROUND ART

In the related art, regarding a method for collecting magnesium which is dissolved in seawater, a method referred to as the Dow method is known (for example, refer to Non-Patent Document 1). In the Dow method, alkali is first added to seawater, and magnesium hydroxide (Mg(OH)$_2$) is obtained. Next, hydrochloric acid is added to the obtained Mg(OH)$_2$, and magnesium chloride (MgCl$_2$) is obtained. Moreover, the obtained MgCl$_2$ is subjected to molten salt electrolysis, and metal magnesium is obtained.

CITATION LIST

Non-Patent Literature

[Non-Patent Document 1]
KEIKINZOKU, Vol. 18, No. 2 (1968)

SUMMARY OF INVENTION

Technical Problem

However, in the foregoing Dow method, a large amount of alkali is used in the reaction of obtaining Mg(OH)$_2$, and a large amount of hydrochloric acid is used in the reaction of obtaining MgCl$_2$. The expenses related to these chemicals results in high costs when magnesium is produced from seawater. For this reason, there is a demand for improvement in which production costs can be reduced.

The present disclosure has been made in consideration of such circumstances, and an object thereof is to provide a system for producing magnesium chloride in which the amounts of chemicals used can be reduced compared to those in methods in the related art. In addition, another object thereof is to provide a system for producing magnesium in which the amounts of the chemicals used can be reduced compared to those in methods in the related art.

Solution to Problem

In order to resolve the foregoing problems, a system for producing magnesium chloride according to the present disclosure includes a removal unit, and a concentration unit that is connected to the removal unit. The removal unit generates feedstock water by removing sulfate ions and sodium ions from treatment target water having seawater as a feedstock. The concentration unit generates a slurry in which magnesium chloride is crystallized by concentrating the feedstock water. The removal unit has a first removal unit which reduces the sulfate ion concentration compared to the sulfate ion concentration in the treatment target water, and a second removal unit which reduces the sodium ion concentration compared to the sodium ion concentration in the treatment target water.

Advantageous Effects of Invention

According to the present disclosure, it is possible to provide a system for producing magnesium chloride in which the amounts of chemicals used can be reduced compared to those in methods in the related art. In addition, it is possible to provide a system for producing magnesium in which the amounts of the chemicals used can be reduced compared to those in methods in the related art.

BRIEF DESCRIPTION OF DRAWINGS

FIG. 5 is a schematic view illustrating the first removal unit 11 of the second embodiment.

DESCRIPTION OF EMBODIMENTS

First Embodiment

Hereinafter, with reference to FIGS. 1 and 2, a system for producing magnesium chloride and a system for producing magnesium according to a first embodiment of the present disclosure will be described. In all drawings below, dimensions, ratios, and the like of constituent elements are suitably changed in order to make the drawings easier to understand.

Figure 1:
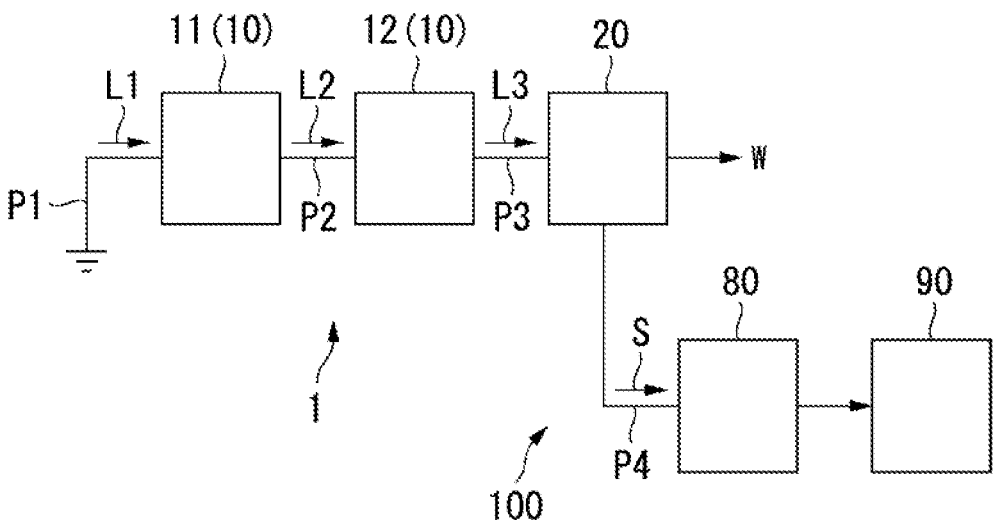
FIG. 1 is a schematic view illustrating a system 1 for producing magnesium chloride and a system 100 for producing magnesium according to a first embodiment of the present disclosure.

FIG. 1 is a schematic view illustrating a system 1 for producing magnesium chloride and a system 100 for producing magnesium according to the first embodiment of the present disclosure.

(System for Producing Magnesium Chloride)

The system 1 for producing magnesium chloride has a removal unit 10 and a concentration unit 20. The removal unit 10 has a first removal unit 11 and a second removal unit 12.

Moreover, the system 1 for producing magnesium chloride has a piping P1 connected to the first removal unit 11, a piping P2 connecting the first removal unit 11 and the second removal unit 12 to each other, and a piping P3 connecting the second removal unit 12 and the concentration unit 20 to each other.

Hereinafter, after principles of functions of the present disclosure are described, constitutions of devices will be described in order.

(Description of Principle)

Figure 2:
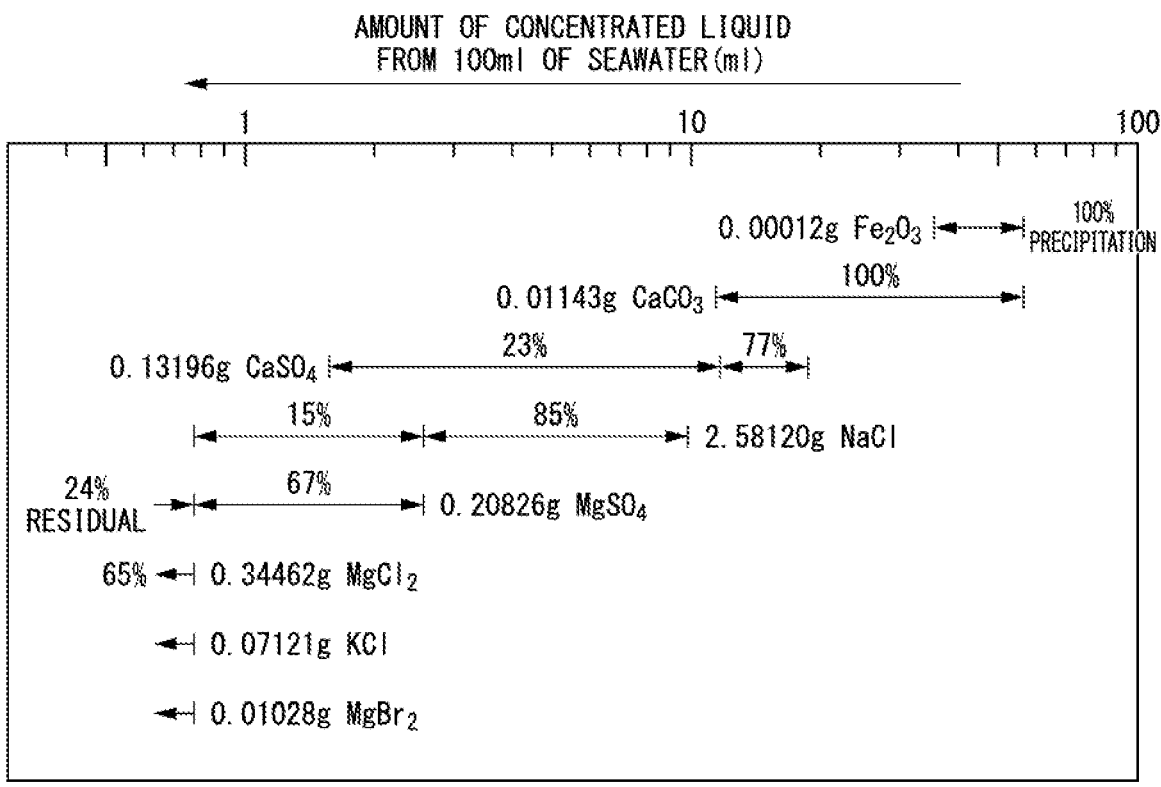
FIG. 2 is an explanatory view of a principle of the system for producing magnesium chloride according to the present disclosure.

FIG. 2 is an explanatory view of a principle of the system 1 for producing magnesium chloride according to the present disclosure, and the diagram shows kinds of salts which precipitate in response to concentration when 100 ml of seawater is concentrated. FIG. 2 shows behavior in seawater at 27° C.

In FIG. 2, the end portion on the right side on the horizontal axis indicates 100 ml of seawater, that is, a state before being concentrated, and the horizontal axis indicates the seawater becoming more concentrated going toward the left side.

As illustrated FIG. 2, when seawater is concentrated, a small amount of ferrous oxide ($Fe_2O_3$) first precipitates due to the difference in solubility with respect to water. Next, calcium carbonate ($CaCO_3$) precipitates, and then calcium sulfate ($CaSO_4$), sodium chloride ($NaCl$), and magnesium sulfate ($MgSO_4$) precipitate in this order.

Regarding the amounts of the foregoing precipitated salts, NaCl is the largest followed by $MgSO_4$ and $CaSO_4$ in this order. The amount of precipitated $CaCO_3$ is smaller than the amount of precipitated $CaSO_4$ by one order of magnitude. The amount of precipitated $Fe_2O_3$ is smaller than the amount of precipitated $CaCO_3$ by two orders of magnitude.

According to FIG. 2, it can be seen that $MgCl_2$, which is a target of production in the system 1 for producing magnesium chloride of the present disclosure, precipitates after these salts have precipitated.

Here, focusing on the salt which precipitates before the $MgCl_2$ described above, it is thought that if the amount of sulfate ions ($SO_4{}^{2-}$) included in seawater could be selectively reduced, precipitation of $MgSO_4$ and $CaSO_4$ could be curbed. Similarly, it is thought that if the amount of sodium ions ($Na^+$) included in seawater could be selectively reduced, precipitation of NaCl could be curbed. The system 1 for producing magnesium chloride of the present disclosure has a constitution based on the foregoing assumptions.

(First Removal Unit)

The first removal unit 11 is a device for reducing a sulfate ion concentration in treatment target water L1 having seawater as a feedstock. The treatment target water L1 is supplied to the first removal unit 11 via the piping P1.

Treatment target water includes not only seawater but also concentrated seawater which has been concentrated by removing water therefrom. For example, a concentrated liquid generated by separating off water through reverse osmosis membrane treatment of seawater corresponds to concentrated seawater.

Moreover, treatment target water also includes a liquid in which the amount of carbonic acid has been reduced through a decarbonation treatment of seawater or concentrated seawater.

Regarding the first removal unit 11, a known electrodialysis tank can be employed. The sulfate ion concentration in the treatment target water L1 can be reduced by removing bivalent anions using an electrodialysis tank.

Figure 3:
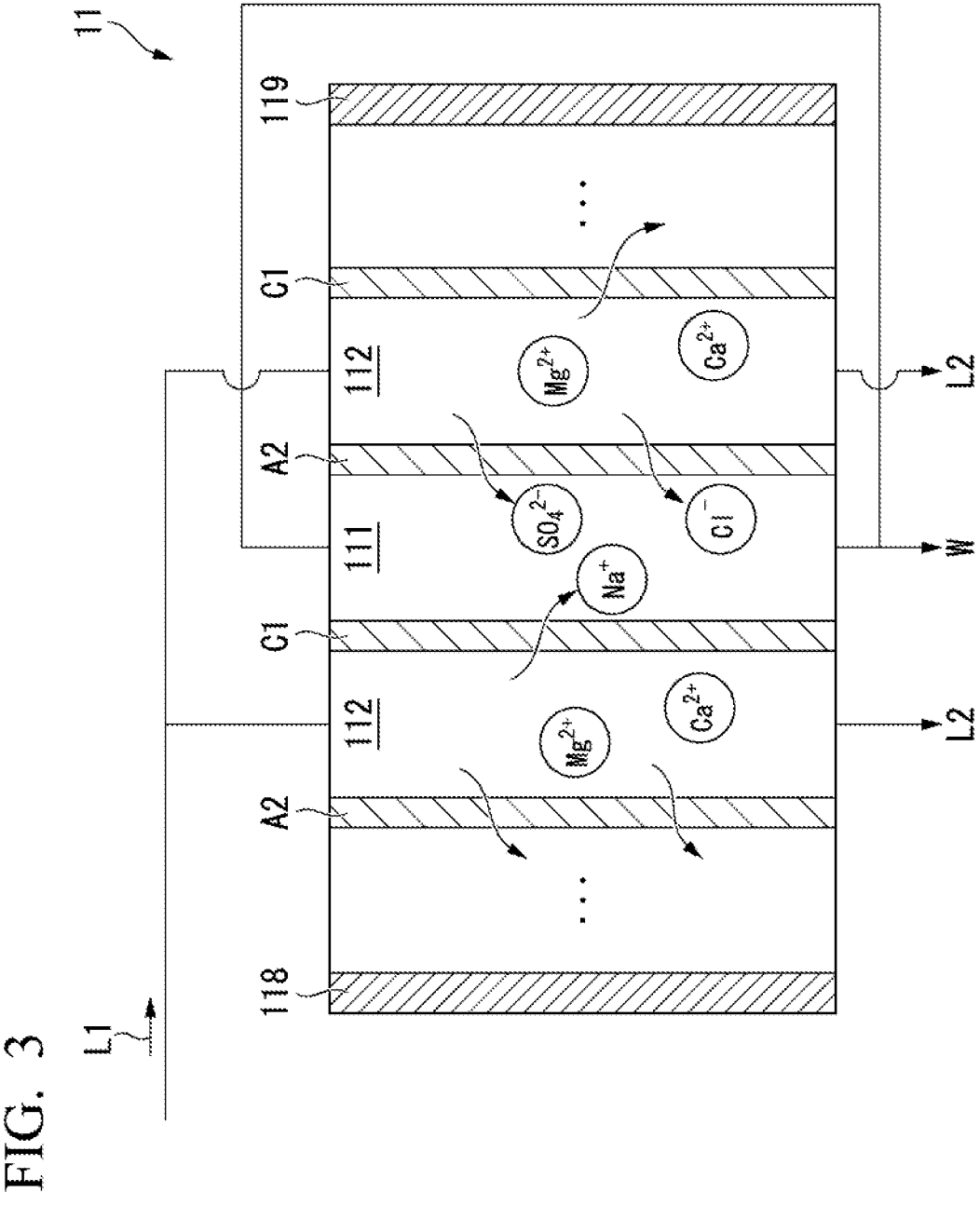
FIG. 3 is a schematic view illustrating a first removal unit 11 of the first embodiment.

FIG. 3 is a schematic view illustrating the first removal unit 11 which is an electrodialysis tank. The first removal unit 11 has an anode 118, a cathode 119, and a plurality of concentration chambers 111 and dilution chambers 112 which are alternately disposed between the anode 118 and the cathode 119. The dilution chambers 112 correspond to "treatment units" in the present disclosure.

The dilution chamber 112 (treatment unit) is adjacent to the concentration chamber 111 disposed on the anode 118 side with respect to the dilution chamber 112 via an anion exchange membrane A2. In addition, the dilution chamber 112 is adjacent to the concentration chamber 111 disposed on the cathode 119 side with respect to the dilution chamber 112 via a monovalent selective cation exchange membrane C1.

In addition, in the present disclosure, "a monovalent selective cation exchange membrane" indicates an ion exchange membrane which allows monovalent cations to selectively permeate therethrough and inhibits permeation of polyvalent cations and anions therethrough regardless of the valence number thereof.

In the present disclosure, "an anion exchange membrane" indicates an ion exchange membrane which allows anions regardless of the valence number thereof to permeate therethrough and inhibits permeation of cations therethrough.

The concentration chambers 111 may have a circulation piping for returning treated water discharged from the concentration chambers 111 to the concentration chambers 111 again.

In the first removal unit 11 having such a constitution, when electrodialysis is performed by supplying the treatment target water L1 to the dilution chambers 112, treated water L2, in which the concentration of bivalent anions such as $SO_4{}^{2-}$ is reduced, is discharged from the dilution chambers 112. In addition, in the treated water L2, the concentration of monovalent ions such as $Na^+$ and chloride ions ($Cl^-$) is reduced.

On the other hand, $SO_4{}^{2-}$, $Na^+$, $Cl^-$, and the like are concentrated in the concentration chambers 111. A liquid discharged from the concentration chambers 111 is treated as waste-water W.

In addition, the first removal unit 11 may be a reaction tank in which calcium chloride is added. When calcium chloride is added to the treatment target water L1, $CaSO_4$ is generated and precipitated due to reaction between calcium ions ($Ca^{2+}$) and $SO_4{}^{2-}$. The sulfate ion concentration in the treatment target water L1 can be reduced by removing the generated $CaSO_4$.

Regarding the constitution of the first removal unit 11, it is preferable to adopt an electrodialysis tank causing no increase in operating expenses due to addition of calcium chloride.

The first removal unit 11 generates the treated water L2 in which the sulfate ion concentration has been reduced compared to that in the treatment target water L1 through the treatment described above. The treated water L2 is supplied to the second removal unit 12 via the piping P2.

(Second Removal Unit)

The second removal unit 12 is a device which is connected to a rear part of the first removal unit 11 and reduces the sodium ion concentration compared to that in the treatment target water L1. In the system 1 for producing magnesium chloride of the present disclosure, the sodium ion concentration is reduced by removing $Na^+$ from the treated water L2.

Regarding the second removal unit 12, a known nano-filtering membrane can be employed. The treated water L2, which has permeated through the nano-filtering membrane, is separated into feedstock water L3 in which the sodium ion concentration has been reduced compared to that in the treatment target water L1, and the waste-water W in which the sodium ion concentration has been increased compared to that in the treatment target water L1.

In the system 1 for producing magnesium chloride, in the treated water L2 subjected to treatment by the second removal unit 12, the amount of $SO_4^{2-}$ is reduced in the first removal unit 11 on an upstream side. Accordingly, in the system 1 for producing magnesium chloride, scale such as calcium sulfate (gypsum) is unlikely to precipitate in the second removal unit 12, and thus stable operation can be continuously performed.

The second removal unit 12 generates the feedstock water L3 in which the sodium ion concentration has been reduced compared to that in the treated water L2 through the treatment described above. The feedstock water L3 is supplied to the concentration unit 20 via the piping P3.

(Concentration Unit)

The concentration unit 20 is a device for performing concentration by removing moisture from the feedstock water L3. Regarding the concentration unit 20, a known device can be employed. For example, the concentration unit 20 can employ a constitution in which moisture is vaporized through treatment such as heating, depressurizing, air-blasting, and a combination of these for the feedstock water L3.

In the concentration unit 20, when the feedstock water L3 is concentrated, ions which have dissolved in the feedstock water L3 become salts and precipitate. Here, in the system 1 for producing magnesium chloride, the amounts of $Na^+$ and $SO_4^{2-}$ are reduced in the removal unit 10. For this reason, as described in FIG. 2, in the concentration unit 20, in addition to small amounts of $Fe_2O_3$ and $CaCO_3$, $MgCl_2$ (target) precipitates, thereby obtaining a slurry S in which $MgCl_2$ is crystallized.

In the concentration unit 20, $MgCl_2$ may be further separated into a lower layer including $MgCl_2$ of a high concentration, and a top clear layer (upper layer) including $MgCl_2$ of a low concentration. The top clear layer is discarded as the waste-water W.

(System for Producing Magnesium)

In addition to the system 1 for producing magnesium chloride described above, the system 100 for producing magnesium has a generation unit 80 and an electrolysis unit 90.

Moreover, the system 100 for producing magnesium has a piping P4 connecting the concentration unit 20 and the generation unit 80 to each other.

(Generation Unit)

The generation unit 80 is a device for obtaining $MgCl_2$ by separating water from the slurry S in which $MgCl_2$ is crystallized. The slurry S is supplied to the generation unit 80 from the concentration unit 20 via the piping P4.

The generation unit 80 can employ a constitution in which moisture is vaporized through treatment such as heating, depressurizing, air-blasting, and a combination of these for the slurry S.

$MgCl_2$ generated by the generation unit 80 is supplied to the electrolysis unit 90.

(Electrolysis Unit)

The electrolysis unit 90 is a device for performing molten salt electrolysis of $MgCl_2$ and obtaining metal magnesium. Regarding the constitution of the electrolysis unit 90, a known molten salt electrolysis facility can be employed.

According to the system 1 for producing magnesium chloride described above, magnesium chloride can be produced after the amounts of chemicals used are reduced compared to those in methods in the related art.

In addition, according to the system 100 for producing magnesium described above, magnesium can be produced after the amounts of chemicals used are reduced compared to those in methods in the related art.

Second Embodiment

Figure 4:
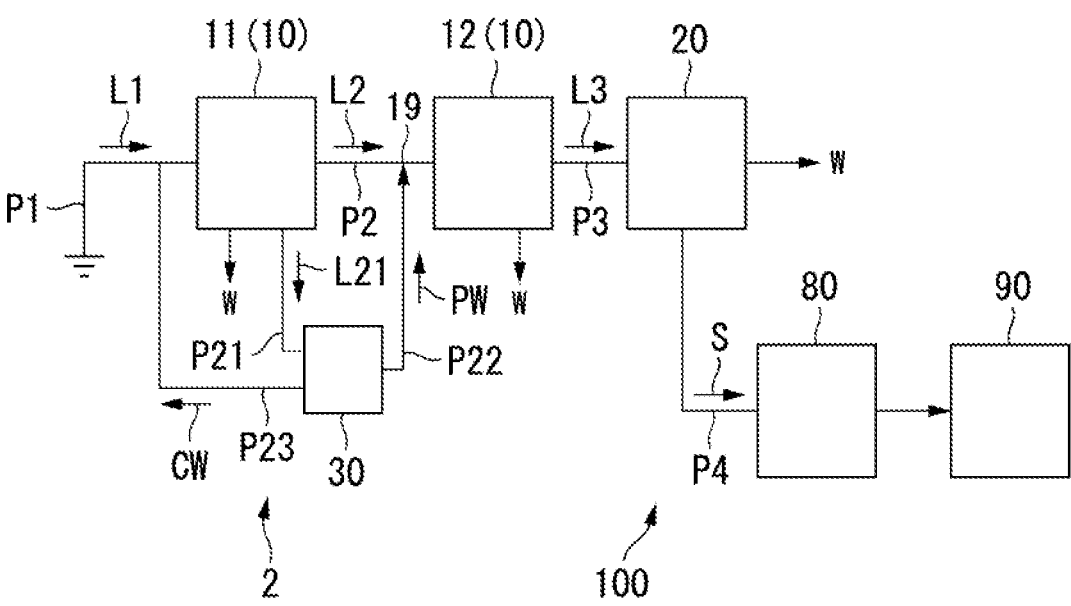
FIG. 4 is a schematic view illustrating a system 2 for producing magnesium chloride and the system 100 for producing magnesium according to a second embodiment of the present disclosure.
Figure 5:
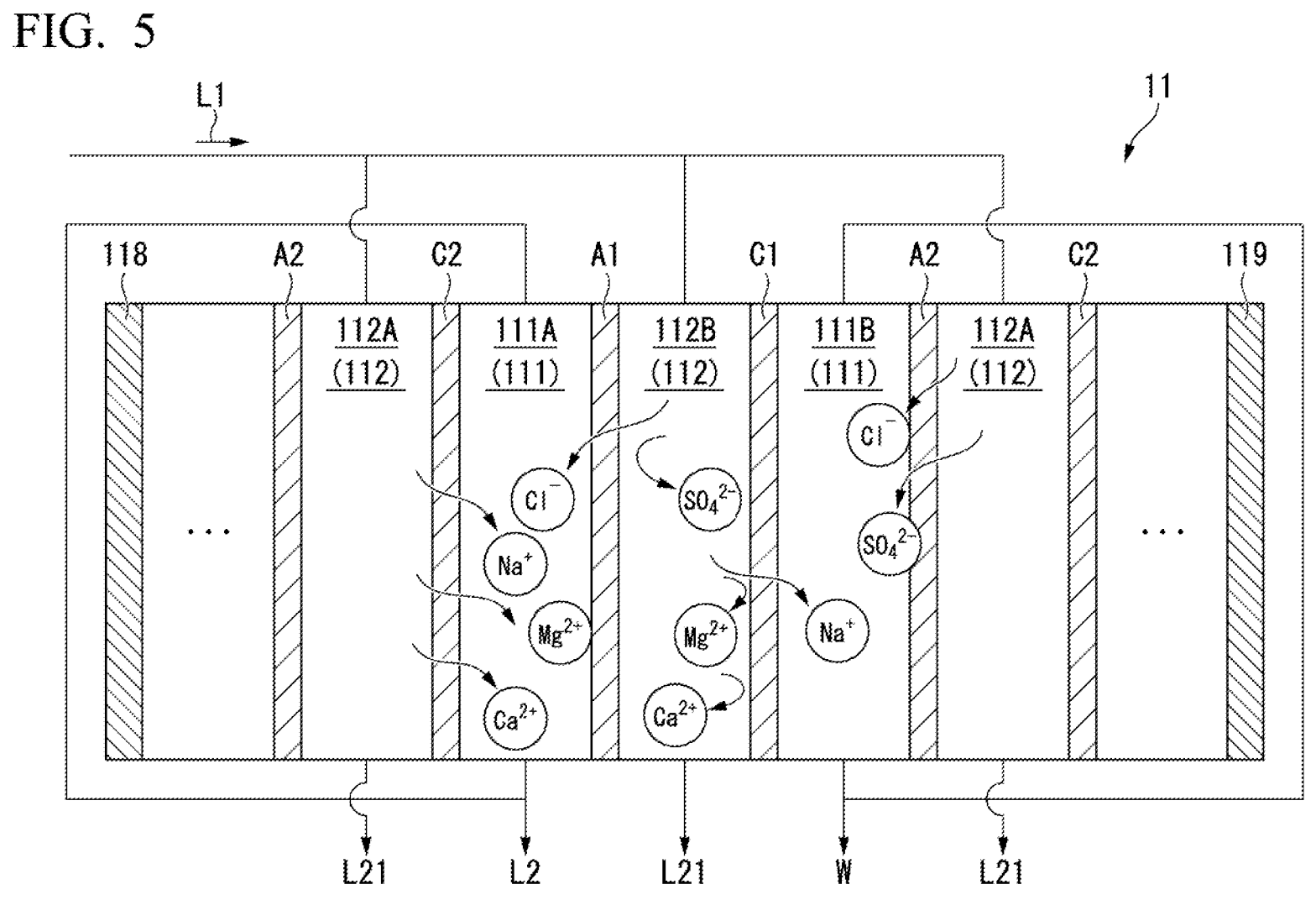

FIGS. 4 and 5 are explanatory views of a system for producing magnesium chloride and the system for producing magnesium according to a second embodiment of the present disclosure. Some of the system for producing magnesium chloride and the system for producing magnesium of the present embodiment is shared by the system for producing magnesium chloride and the system for producing magnesium of the first embodiment. Therefore, the same reference signs are applied to constituent elements in the present embodiment which are the same as those in the first embodiment, and detailed description thereof will be omitted.

(System for Producing Magnesium Chloride)

FIG. 4 is a schematic view illustrating a system 2 for producing magnesium chloride and the system 100 for producing magnesium. The system 2 for producing magnesium chloride has the removal unit 10 and the concentration unit 20. The removal unit 10 has the first removal unit 11, the second removal unit 12, and a reverse osmosis membrane 30.

(First Removal Unit)

FIG. 5 is a schematic view illustrating the first removal unit 11 of the second embodiment. The first removal unit 11 is an electrodialysis tank and has the anode 118, the cathode 119, and a plurality of first concentration chambers 111A, second concentration chambers 111B, first dilution chambers 112A, and second dilution chambers 112B which are arranged between the anode 118 and the cathode 119. The first concentration chambers 111A, the second concentration chambers 111B, and the first dilution chambers 112A correspond to "treatment units" in the present disclosure.

The second concentration chambers 111B correspond to the concentration chambers 111 of the first embodiment.

The first concentration chambers 111A may have a circulation piping for returning treated water discharged from the first concentration chambers 111A to the first concentration chambers 111A again.

Similarly, the second concentration chambers 111B may have a circulation piping for returning treated water discharged from the second concentration chambers 111B to the second concentration chambers 111B again.

Each of the first concentration chambers 111A is surrounded by a cation exchange membrane C2 and a monovalent selective anion exchange membrane A1.

Each of the second concentration chambers 111B is surrounded by the monovalent selective cation exchange membrane C1 and the anion exchange membrane A2.

In the present disclosure, "a cation exchange membrane" indicates an ion exchange membrane which allows cations to permeate therethrough regardless of the valence number thereof and inhibits permeation of anions therethrough.

In addition, in the present disclosure, "a monovalent selective anion exchange membrane" indicates an ion exchange membrane which allows monovalent cations to selectively permeate therethrough and inhibits permeation of polyvalent anions and cations therethrough regardless of the valence number thereof.

Each of the first dilution chamber 112A is surrounded by the cation exchange membrane C2 and the anion exchange membrane A2.

Each of the second dilution chamber 112B is surrounded by the monovalent selective cation exchange membrane C1 and the monovalent selective anion exchange membrane A1.

The first concentration chamber 111A is adjacent to the first dilution chamber 112A via the cation exchange membrane C2. In addition, the first concentration chamber 111A is adjacent to the second dilution chamber 112B via the monovalent selective anion exchange membrane A1.

The first dilution chamber 112A is adjacent to the second concentration chamber 111B via the anion exchange membrane A2. In addition, the first dilution chamber 112A is adjacent to the first concentration chamber 111A via the cation exchange membrane C2.

The second dilution chamber 112B is adjacent to the first concentration chamber 111A via the monovalent selective anion exchange membrane A1. In addition, the second dilution chamber 112B is adjacent to the second concentration chamber 111B via the monovalent selective cation exchange membrane C1.

The second concentration chamber 111B is adjacent to the second dilution chamber 112B via the monovalent selective cation exchange membrane C1. In addition, the second concentration chamber 111B is adjacent to the first dilution chamber 112A via the anion exchange membrane A2.

In addition, the first dilution chambers 112A, the first concentration chambers 111A, the second dilution chambers 112B, and the second concentration chambers 111B are repeatedly disposed in this order between the anode 118 and the cathode 119.

In the first removal unit 11 having such a constitution, the treatment target water L1 is supplied to the first dilution chambers 112A and the second dilution chambers 112B.

Cations included in the treatment target water L1 supplied to the first dilution chamber 112A move to the adjacent first concentration chamber 111A via the cation exchange membrane C2.

In addition, anions included in the treatment target water L1 supplied to the first dilution chamber 112A move to the adjacent second concentration chamber 111B via the anion exchange membrane A2.

Monovalent cations included in the treatment target water L1 supplied to the second dilution chamber 112B move to the adjacent second concentration chamber 111B via the monovalent selective cation exchange membrane C1.

In addition, monovalent anions included in the treatment target water L1 supplied to the first dilution chamber 112A move to the adjacent first concentration chamber 111A via the monovalent selective anion exchange membrane A1.

Accordingly, cations and monovalent anions are concentrated in the first concentration chambers 111A. That is, in the treated water L2 discharged from the first concentration chambers 111A, bivalent anions such as $SO_4^{2-}$ are removed.

In addition, in the first removal unit 11, since the first dilution chambers 112A, the first concentration chambers 111A, the second dilution chambers 112B, and the second concentration chambers 111B are repeatedly arranged, electrodialysis becomes parallel treatment, and thus the sulfate ion concentration in the treatment target water L1 can be efficiently reduced.

In addition, monovalent cations and anions are concentrated in the second concentration chambers 111B. That is, in the second concentration chambers 111B, ions including $Na^+$ and $SO_4^{2-}$, which are unnecessary in the system for producing magnesium chloride, are concentrated. For this reason, a liquid discharged from the second concentration chambers 111B is treated as the waste-water W.

Diluted water L21 obtained by reducing cations and anions in the treatment target water L1 is discharged from the first dilution chambers 112A and the second dilution chambers 112B. The diluted water L21 is supplied, via a supply tube P21, to a mixing unit 19 which is provided inside the piping P2 for supplying the treated water L2 from the first removal unit 11 to the second removal unit 12. In the present embodiment, the mixing unit 19 indicates a location where the piping P2 and the supply tube P21 are connected to each other.

(Reverse Osmosis Membrane)

The reverse osmosis membrane 30 is provided inside a path of the supply tube P21. The reverse osmosis membrane 30 separates the diluted water L21 into pure water PW and concentrated water CW. That is, the reverse osmosis membrane 30 supplies the pure water PW to the piping P2 via the supply tube P21.

In the piping P2, the treated water L2 and the pure water PW are mixed so that the concentration of the treated water L2 decreases. Accordingly, the osmotic pressure of the treated water L2 is reduced, and thus treatment can be easily performed in the second removal unit 12. In addition, since the pure water PW is used for dilution of the treated water L2, scale such as $CaSO_4$ (gypsum) is unlikely to precipitate in the second removal unit 12, and thus stable operation can be continuously performed.

In the present embodiment, the mixing unit 19 is a connection location between the piping P2 and the supply tube P21, a mixing tank in which the treated water L2 and the pure water PW are mixed may be provided as a mixing unit inside a path of the piping P2.

As illustrated FIG. 4, the concentrated water CW may be supplied to the piping P1 connected to the first removal unit 11 via a piping P22. In addition, the concentrated water CW may be discarded.

Even in the system 2 for producing magnesium chloride having such a constitution, magnesium chloride can be produced after the amounts of chemicals used are reduced compared to those in methods in the related art.

The constitution of the first removal unit 11 illustrated in the present embodiment can also be employed in the system 1 for producing magnesium chloride of the first embodiment.

In addition, the reverse osmosis membrane 30 employed in the present embodiment can also be omitted.

Third Embodiment

Figure 6:
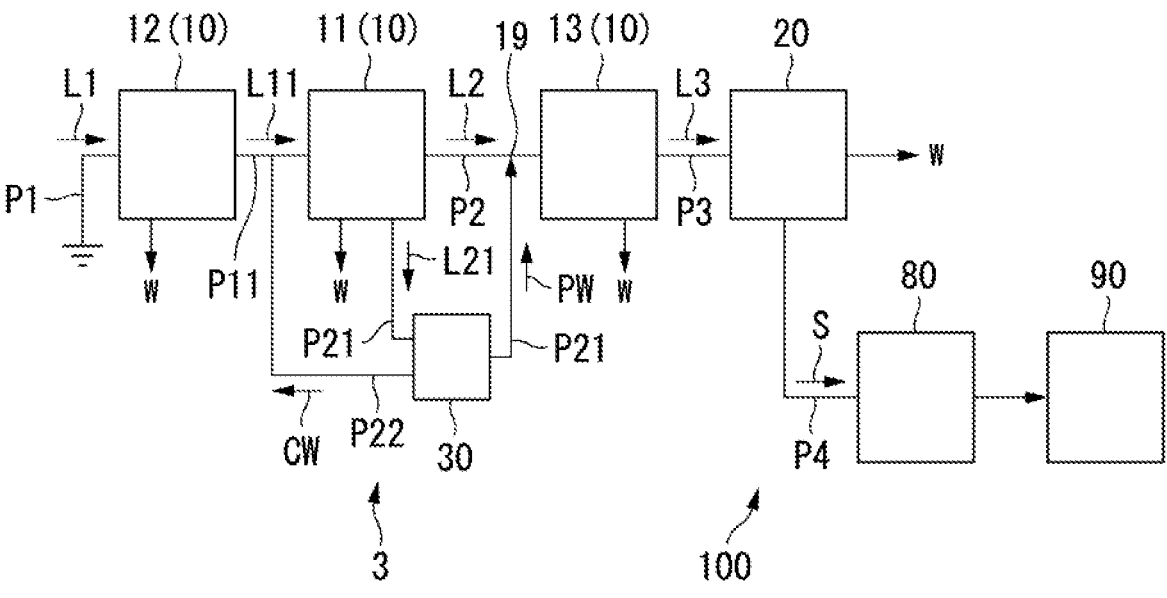
FIG. 6 is a schematic view illustrating a system 3 for producing magnesium chloride and the system 100 for producing magnesium according to a third embodiment of the present disclosure.
Figure 7:
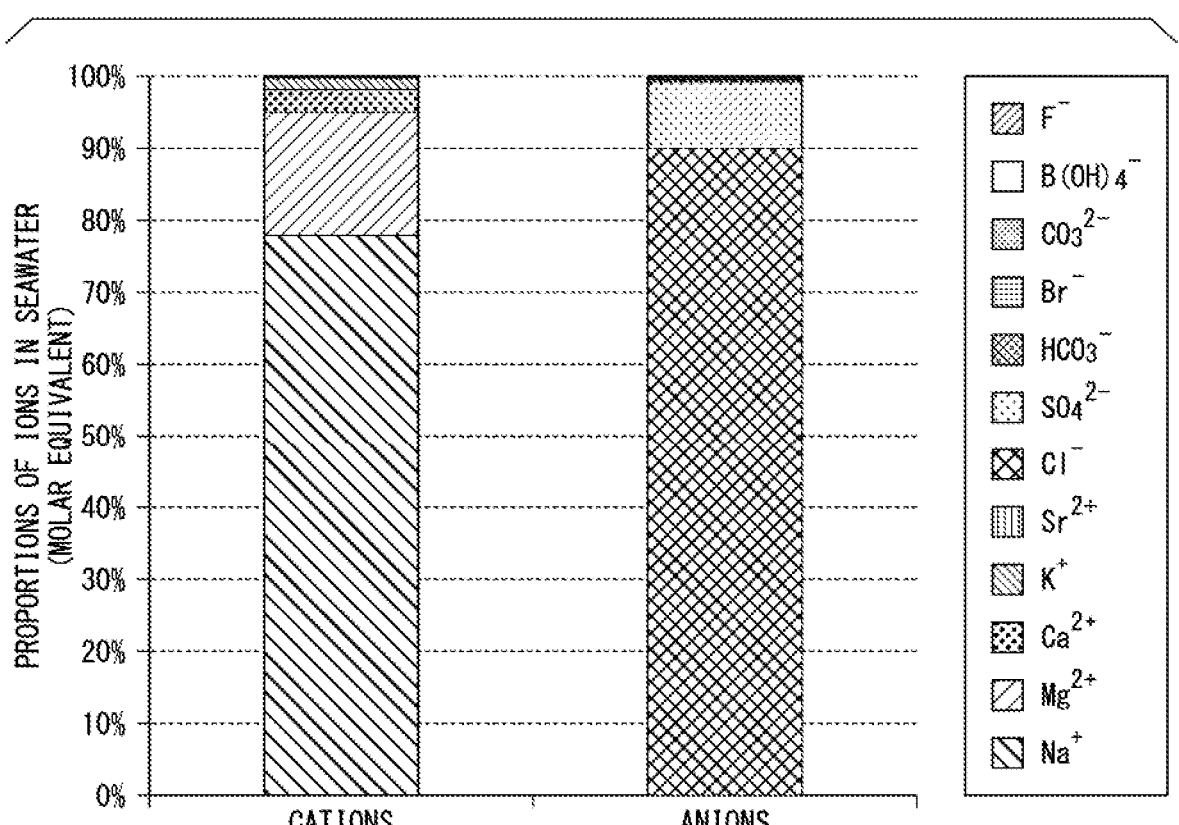
FIG. 7 is a graph showing proportions of ions in seawater.

FIGS. 6 and 7 are explanatory views of a system for producing magnesium chloride and the system for producing magnesium according to a third embodiment of the present disclosure. The same reference signs are applied to constituent elements in the present embodiment which are the same as those in the first and second embodiments, and detailed description thereof will be omitted.

(System for Producing Magnesium Chloride)

FIG. 6 is a schematic view illustrating a system 3 for producing magnesium chloride and the system 100 for producing magnesium. The system 3 for producing magnesium chloride has the removal unit 10 and the concentration unit 20.

The removal unit 10 of the system 3 for producing magnesium chloride has the first removal unit 11, the second removal unit 12, a third removal unit 13, and the reverse osmosis membrane 30. In addition, in the removal unit 10, the second removal unit 12, the first removal unit 11, and the third removal unit 13 are connected in this order.

FIG. 7 is a graph showing proportions of ions in seawater. In FIG. 7, regarding cations and anions in seawater, the proportion of each of the ions is indicated in molar equivalent with the total amount of 100%.

As is evident from FIG. 7, large amounts of Na and $Cl^-$ are included in seawater. For this reason, as in the systems for producing magnesium chloride of the first embodiment and the second embodiment, when treatment of removing $SO_4^{2-}$ from the treatment target water L1 is performed first in the first removal unit 11, it is assumed that large amounts of these $Na^+$ and $Cl^-$ may disturb the treatment.

For this reason, in the system 3 for producing magnesium chloride of the present embodiment, the second removal unit 12 is disposed in front of the first removal unit 11 and removes Na and $Cl^-$ in advance.

Regarding the second removal unit 12, it is possible to employ a known electrodialysis tank which has a monovalent selective cation exchange membrane and a monovalent selective anion exchange membrane and selectively removes monovalent cations and monovalent anions. Accordingly, treated water L11 from which $Na^+$ and $Cl^-$ are removed is discharged from the second removal unit 12. The treated water L11 is supplied to the first removal unit 11 from the second removal unit 12 via a piping P11.

The first removal unit 11 removes $SO_4^{2-}$ from the treated water L11 supplied from the second removal unit 12. The treated water L2 is supplied to the third removal unit 13 from the first removal unit 11 via the piping P2.

(Third Removal Unit)

The third removal unit 13 is a device which is connected to a rear part of the first removal unit 11 and reduces the sodium ion concentration compared to that in the treatment target water L1. In the system 3 for producing magnesium chloride of the present disclosure, the sodium ion concentration is reduced by removing $Na^+$ from the treated water L2.

Regarding the third removal unit 13, a known nano-filtering membrane can be employed. The treated water L2, which has permeated through the nano-filtering membrane, is separated into the feedstock water L3 in which the sodium ion concentration has been reduced compared to that in the treatment target water L1, and the waste-water W in which the sodium ion concentration has been increased compared to that in the treatment target water L1.

In the system 3 for producing magnesium chloride, in the treated water L2 subjected to treatment by the third removal unit 13, the amount of $SO_4^{2-}$ is reduced in the first removal unit 11 on the upstream side. Accordingly, in the system 3 for producing magnesium chloride, scale such as $CaSO_4$ (gypsum) is unlikely to precipitate in the third removal unit 13, and thus stable operation can be continuously performed.

In addition, in the treated water L2 subjected to treatment by the third removal unit 13, the amount of $Na^+$ is reduced in the second removal unit 12 on the upstream side. Accordingly, in the system 3 for producing magnesium chloride, a treatment load is reduced in the second removal unit 12 and the third removal unit 13, and thus stable operation can be continuously performed.

For example, when the amount of $Na^+$ is reduced in the second removal unit 12 and the treated water L11 scarcely includes $Na^r$, the third removal unit 13 can be omitted.

In addition, for example, when the amounts of monovalent cations and bivalent cations included in the treated water L11 are caused to be equivalent to each other by reducing $Na^+$ in the second removal unit 12, and when the treated water L11 is further treated in the first removal unit 11 as described above, the third removal unit 13 can be omitted.

Even in the system 3 for producing magnesium chloride having such a constitution, magnesium chloride can be produced after the amounts of chemicals used are reduced compared to those in methods in the related art.

Fourth Embodiment

Figure 8:
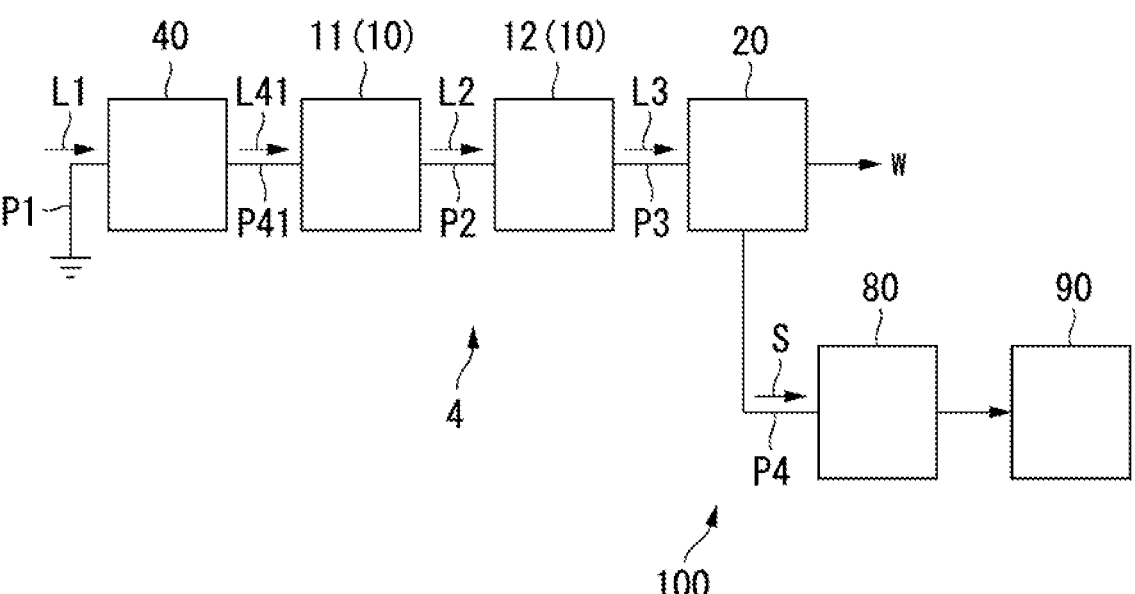
FIG. 8 is an explanatory view of production systems including the system 3 for producing magnesium chloride and the system 100 for producing magnesium according to a fourth embodiment of the present disclosure.

FIG. 8 is an explanatory view of production systems including the system 3 for producing magnesium chloride and the system 100 for producing magnesium according to a fourth embodiment of the present disclosure. The same reference signs are applied to constituent elements in the present embodiment which are the same as those in the first to third embodiments, and detailed description thereof will be omitted.

(Decarbonation Unit)

The system 4 for producing magnesium chloride of the present embodiment has a decarbonation unit 40 for removing carbonic acid which dissolves in the treatment target water L1. FIG. 8 illustrates that the decarbonation unit 40 is provided on the upstream side of the removal unit 10 in the system 1 for producing magnesium chloride of the first embodiment. The piping P1 and a piping P41 are connected to the decarbonation unit 40. The piping P41 connects the decarbonation unit 40 and the first removal unit 11 to each other.

The decarbonation unit 40 can employ a known constitution. Examples of the decarbonation unit 40 can include a decarbonator which removes carbonic acid included in the treatment target water L1 by aerating the treatment target water L1 after acid is added to the treatment target water L1. Hydrochloric acid or sulfuric acid can be used as acid to be added to the treatment target water L1.

Treatment target water (treatment target water L41) subjected to a decarbonation treatment by the decarbonation unit 40 is supplied to the removal unit 10 (first removal unit 11) via the piping P41. Treatment on a downstream side of the removal unit 10 is performed as described in the first embodiment.

In the system 4 for producing magnesium chloride having such a constitution, in addition to $Na^+$ and $SO_4^{2-}$ which are removed in the removal unit 10, carbonate ions included in the treatment target water L1 are also removed. For this reason, as illustrated FIG. 2, when the feedstock water L3 is concentrated in the concentration unit 20, precipitation of $CaCO_3$ can also be curbed.

For this reason, even in the system 4 for producing magnesium chloride, magnesium chloride can be produced after the amounts of chemicals used are reduced compared to those in methods in the related art. Moreover, $CaCO_3$ which may be incorporated into obtained magnesium chloride can be reduced, and magnesium chloride of high purity can be produced.

The constitution of the decarbonation unit 40 illustrated in the present embodiment can also be employed in the system 2 for producing magnesium chloride of the second embodiment and the system 3 for producing magnesium chloride of the third embodiment.

Hereinabove, examples of preferred embodiments according to the present disclosure have been described with reference to the accompanying drawings, but the present disclosure is not limited to these examples. The various shapes, combinations, and the like of the constituent members illustrated in the examples described above are examples, and various changes can be made on the basis of requirement of design or the like within a range not departing from the gist of the present disclosure.

APPENDIX

The system for producing magnesium chloride according to each of the embodiments is ascertained as follows, for example.

[1] A system for producing magnesium chloride according to a first aspect includes a removal unit 10, and a concentration unit 20 that is connected to the removal unit 10. The removal unit 10 generates feedstock water L3 by removing sulfate ions and sodium ions from treatment target water L1 having seawater as a feedstock. The concentration unit 20 generates a slurry in which magnesium chloride is crystallized by concentrating the feedstock water L3. The removal unit 10 has a first removal unit 11 which reduces the sulfate ion concentration compared to that in the treatment target water L1, and a second removal unit 12 which reduces the sodium ion concentration compared to that in the treatment target water L1.

According to the foregoing constitution, it is possible to obtain the slurry S in which magnesium chloride is crystallized by concentrating the feedstock water L3 which is obtained by removing sodium ions and sulfate ions from the treatment target water L1. For this reason, it is possible to realize a system for producing magnesium chloride in which the amounts of chemicals used can be reduced compared to those in methods in the related art.

[2] In the system for producing magnesium chloride according to a second aspect, the second removal unit 12 is connected to a rear part of the first removal unit 11. The second removal unit 12 is a nano-filtering membrane that separates treated water L2 in which the sulfate ion concentration has been reduced compared to that in the treatment target water L1 by the first removal unit 11 into the feedstock water L3 and waste-water W.

According to the foregoing constitution, since treatment of reducing sulfate ions can be performed in the first removal unit 11 before treatment is performed in the second removal unit 12 which is a nano-filtering membrane, precipitation of scale such as gypsum in the nano-filtering membrane (second removal unit 12) can be curbed, and thus stable operation can be performed for a long period of time.

[3] In the system for producing magnesium chloride according to a third aspect, the first removal unit 11 is connected to a rear part of the second removal unit 12. The second removal unit 12 is an electrodialysis tank which reduces the sodium ion concentration and a chloride ion concentration compared to those in the treatment target water L1.

According to the foregoing constitution, since treatment of reducing sodium ions can be performed in the second removal unit 12 before treatment is performed in the first removal unit 11, a treatment load in the second removal unit 12 is reduced.

[4] In the system for producing magnesium chloride according to a fourth aspect, the removal unit 10 further has a third removal unit 13 which is connected to a rear part of the first removal unit 11. The third removal unit 13 is a nano-filtering membrane that reduces the sodium ion concentration in the treated water L2 in which the sulfate ion concentration has been reduced compared to that in the treatment target water L1 by the first removal unit 11.

According to the foregoing constitution, treatment of reducing sulfate ions can be performed in the first removal unit 11 before treatment is performed in the third removal unit 13 which is a nano-filtering membrane. For this reason, precipitation of scale such as gypsum in the nano-filtering membrane (third removal unit 13) can be curbed, and thus stable operation can be performed for a long period of time.

In addition, since the amount of sodium ions are reduced in the second removal unit 12 in advance, a treatment load in the third removal unit 13 can be reduced, and thus stable operation can be performed for a long period of time.

[5] In the system for producing magnesium chloride according to a fifth aspect, the first removal unit 11 is an electrodialysis tank. The electrodialysis tank has an anode 118, a cathode 119, and a plurality of concentration chambers 111 and a plurality of treatment units which are disposed between the anode 118 and the cathode 119. The concentration chambers 111 and the treatment units are alternately disposed in a repeated manner between the anode 118 and the cathode 119. Each of the treatment units is adjacent, via an anion exchange membrane A2, to the concentration chamber 111 disposed on the anode 118 side with respect to the treatment unit and is adjacent, via a monovalent selective cation exchange membrane C1, to the concentration chamber 111 disposed on the cathode 119 side with respect to the treatment unit. The treatment target water L1 is supplied to the treatment units. The treated water L2 in which the sulfate ion concentration has been reduced compared to that in the treatment target water L1 is discharged from the treatment units.

According to the foregoing constitution, it is possible to obtain the treated water L2 by reducing the sulfate ion concentration in the treatment target water L1 through electrodialysis.

[6] In the system for producing magnesium chloride according to a sixth aspect, the treatment units have a first concentration chamber 111A, a first dilution chamber 112A, and a second dilution chamber 112B which are disposed between the anion exchange membrane and the monovalent selective cation exchange membrane C1. The concentration chamber is a second concentration chamber 111B. The first dilution chamber 112A, the first concentration chamber 111A, the second dilution chamber 112B, and the second concentration chamber 111B are repeatedly disposed in this order from the anode 118 side to the cathode 119 side between the anode 118 and the cathode 119. The first dilution chamber 112A is adjacent to the second concentration chamber 111B via the anion exchange membrane A2 and is adjacent to the first concentration chamber 111A via a cation exchange membrane C2. The second dilution chamber 112B is adjacent to the second concentration chamber 111B via the monovalent selective cation exchange membrane C1 and is adjacent to the first concentration chamber 111A via a monovalent selective anion exchange membrane A1. The treatment target water L1 is supplied to the first dilution chamber 112A and the second dilution chamber 112B. The treated water L2 is discharged from the first concentration chamber 111A. Diluted water L21 in which the sodium ion concentration and the chloride ion concentration have been reduced compared to those in the treatment target water is discharged from the first dilution chamber 112A and the second dilution chamber 112B.

According to the foregoing aspect, electrodialysis becomes parallel treatment, and thus the sulfate ion concentration in the treatment target water L1 can be efficiently reduced.

[7] The system 1 for producing magnesium chloride according to a seventh aspect further includes a mixing unit 19 that is provided inside a path for supplying the treated water L2 in which the sulfate ion concentration has been reduced compared to that in the treatment target water L1 by the first removal unit 11 from the first removal unit 11 to the second removal unit 12 and mixes at least some of the diluted water L21 and the treated water, and a supply tube P21 that supplies the diluted water L21 from the first removal unit 11 to the mixing unit.

According to the foregoing aspect, the treated water L2 and the diluted water L21 are mixed so that the concentration of the treated water L2 decreases. Accordingly, the treatment load in the second removal unit 12 is reduced.

[8] In the system for producing magnesium chloride according to an eighth aspect, a reverse osmosis membrane 30 which separates the diluted water L21 into pure water and concentrated water is provided inside a path of the supply tube P21. The pure water is supplied to the mixing unit 19.

According to the foregoing aspect, the treated water L2 and the diluted water L21 are mixed so that the concentration of the treated water L2 decreases. Accordingly, the treatment load in the second removal unit 12 is reduced.

[9] The system for producing magnesium chloride according to a ninth aspect further includes a decarbonation unit 40 that removes at least some of carbonic acid included in the treatment target water L1.

According to the foregoing aspects, the amount of calcium carbonate which may be incorporated into magnesium chloride that precipitates in the concentration unit 20 can be reduced, and magnesium chloride of high purity can be obtained.

In addition, the system for producing magnesium according to each of the embodiments is ascertained as follows, for example.

A system for producing magnesium according to a tenth aspect includes the system for producing magnesium chloride according to any one aspect from first to ninth aspects, a generation unit 80 that generates magnesium chloride by separating water from the slurry S, and an electrolysis unit 90 that obtains metal magnesium through molten salt electrolysis of the magnesium chloride.

According to the foregoing aspects, it is possible to provide a system 100 for producing magnesium in which the amounts of chemicals used can be reduced compared to those in methods in the related art.

REFERENCE SIGNS LIST

1, 2, 3, 4 System for producing magnesium chloride
10 Removal unit
11 First removal unit
12 Second removal unit
13 Third removal unit
19 Mixing unit
20 Concentration unit
30 Reverse osmosis membrane
40 Decarbonation unit
80 Generation unit
90 Electrolysis unit
100 System for producing magnesium
111 Concentration chamber
111A First concentration chamber
111B Second concentration chamber
112 Dilution chamber
112A First dilution chamber
112B Second dilution chamber
118 Anode
119 Cathode
A1 Monovalent selective anion exchange membrane
A2 Anion exchange membrane
C1 Monovalent selective cation exchange membrane
C2 Cation exchange membrane
CW Concentrated water L1, L41 Treatment target water
L2, L11 Treated water
L3 Feedstock water
L21 Dilution water
P21 Supply tube
PW Pure water
S Slurry
W Waste-water

The invention claimed is:

1. A system for producing magnesium chloride comprising:
   a removal unit; and
   a concentration unit that is connected to the removal unit,
   wherein the removal unit generates feedstock water by removing sulfate ions and sodium ions from treatment target water having seawater as a feedstock,
   wherein the concentration unit generates a slurry in which magnesium chloride is crystallized by concentrating the feedstock water, and
   wherein the removal unit has
      a first removal unit is an electrodialysis tank, which reduces a sulfate ion concentration compared to the sulfate ion concentration in the treatment target water, and
      a second removal unit which reduces a sodium ion concentration compared to the sodium ion concentration in the treatment target water.

2. A system for producing magnesium chloride comprising:
   a removal unit; and
   a concentration unit that is connected to the removal unit,
   wherein the removal unit generates feedstock water by removing sulfate ions and sodium ions from treatment target water having seawater as a feedstock,
   wherein the concentration unit generates a slurry in which magnesium chloride is crystallized by concentrating the feedstock water, and
   wherein the removal unit has
      a first removal unit which reduces a sulfate ion concentration compared to the sulfate ion concentration in the treatment target water, and
      a second removal unit which reduces a sodium ion concentration compared to the sodium ion concentration in the treatment target water,
   wherein the second removal unit is connected to a rear part of the first removal unit, and
   wherein the second removal unit is a nano-filtering membrane that separates treated water in which the sulfate ion concentration has been reduced compared to the sulfate ion concentration in the treatment target water by the first removal unit into the feedstock water and waste-water.

3. A system for producing magnesium chloride comprising:
   a removal unit; and
   a concentration unit that is connected to the removal unit,
   wherein the removal unit generates feedstock water by removing sulfate ions and sodium ions from treatment target water having seawater as a feedstock,
   wherein the concentration unit generates a slurry in which magnesium chloride is crystallized by concentrating the feedstock water, and
   wherein the removal unit has
      a first removal unit which reduces a sulfate ion concentration compared to the sulfate ion concentration in the treatment target water, and

15 a second removal unit which reduces a sodium ion concentration compared to the sodium ion concentration in the treatment target water, wherein the first removal unit is connected to a rear part of the second removal unit, and wherein the second removal unit is an electrodialysis tank that reduces the sodium ion concentration and a chloride ion concentration compared to the sodium ion concentration and the chloride ion concentration in the treatment target water.

4. The system for producing magnesium chloride according to claim 3, wherein the removal unit further has a third removal unit which is connected to a rear part of the first removal unit, and wherein the third removal unit is a nano-filtering membrane that reduces the sodium ion concentration compared to the sodium ion concentration in treated water in which the sulfate ion concentration has been reduced compared to the sulfate ion concentration in the treatment target water by the first removal unit.

5. The system for producing magnesium chloride according to claim 1, wherein the first removal unit is the electrodialysis tank, wherein the electrodialysis tank has an anode, a cathode, and a plurality of concentration chambers and a plurality of treatment units which are disposed between the anode and the cathode, wherein the concentration chambers and the treatment units are alternately disposed in a repeated manner between the anode and the cathode, wherein each of the treatment units is adjacent, via an anion exchange membrane, to the concentration chamber disposed on the anode side with respect to the treatment unit and is adjacent, via a monovalent selective cation exchange membrane, to the concentration chamber disposed on the cathode side with respect to the treatment unit, wherein the treatment target water is supplied to the treatment units, and wherein treated water in which the sulfate ion concentration has been reduced compared to the sulfate ion concentration in the treatment target water is discharged from the treatment units.

6. The system for producing magnesium chloride according to claim 5, wherein the treatment units have a first concentration chamber, a first dilution chamber, and a second dilution chamber which are disposed between the anion exchange membrane and the monovalent selective cation exchange membrane, wherein the concentration chamber is a second concentration chamber, wherein the first dilution chamber, the first concentration chamber, the second dilution chamber, and the second concentration chamber are repeatedly disposed in this order from the anode side to the cathode side between the anode and the cathode, wherein the first dilution chamber is adjacent to the second concentration chamber via the anion exchange membrane and is adjacent to the first concentration chamber via a cation exchange membrane, wherein the second dilution chamber is adjacent to the second concentration chamber via the monovalent selective cation exchange membrane and is adjacent to the first concentration chamber via a monovalent selective anion exchange membrane, wherein the treatment target water is supplied to the first dilution chamber and the second dilution chamber, wherein the treated water is discharged from the first concentration chamber, and wherein diluted water in which the sodium ion concentration and the chloride ion concentration have been reduced compared to the sodium ion concentration and the chloride ion concentration in the treatment target water is discharged from the first dilution chamber and the second dilution chamber.

7. The system for producing magnesium chloride according to claim 6 further comprising:

a mixing unit that is provided inside a path for supplying treated water in which the sulfate ion concentration has been reduced compared to the sulfate ion concentration in the treatment target water by the first removal unit from the first removal unit to the second removal unit and mixes at least some of the diluted water and the treated water; and a supply tube that supplies the diluted water from the first removal unit to the mixing unit.

8. The system for producing magnesium chloride according to claim 7, wherein a reverse osmosis membrane which separates the diluted water into pure water and concentrated water is provided inside a path of the supply tube, wherein the pure water is supplied to the mixing unit.

9. The system for producing magnesium chloride according to claim 1 further comprising:

a decarbonation unit that removes at least some of carbonic acid included in the treatment target water.

10. A system for producing magnesium comprising:

the system for producing magnesium chloride according to claim 1;

a generation unit that generates magnesium chloride by separating water from the slurry; and an electrolysis unit that obtains metal magnesium through molten salt electrolysis of the magnesium chloride.

11. The system for producing magnesium chloride according to claim 2, wherein the first removal unit is the electrodialysis tank, wherein the first removal unit has an anode, a cathode, and a plurality of concentration chambers and a plurality of treatment units which are disposed between the anode and the cathode, wherein the concentration chambers and the treatment units are alternately disposed in a repeated manner between the anode and the cathode, wherein each of the treatment units is adjacent, via an anion exchange membrane, to the concentration chamber disposed on the anode side with respect to the treatment unit and is adjacent, via a monovalent selective cation exchange membrane, to the concentration chamber disposed on the cathode side with respect to the treatment unit, wherein the treatment target water is supplied to the treatment units, and wherein treated water in which the sulfate ion concentration has been reduced compared to the sulfate ion concentration in the treatment target water is discharged from the treatment units.

12. The system for producing magnesium chloride according to claim 3, wherein the first removal unit is the electrodialysis tank, wherein the first removal unit has an anode, a cathode, and a plurality of concentration chambers and a plurality of treatment units which are disposed between the anode and the cathode, wherein the concentration chambers and the treatment units are alternately disposed in a repeated manner between the anode and the cathode, wherein each of the treatment units is adjacent, via an anion exchange membrane, to the concentration chamber disposed on the anode side with respect to the treatment unit and is adjacent, via a monovalent selective cation exchange membrane, to the concentration chamber disposed on the cathode side with respect to the treatment unit, wherein the treatment target water is supplied to the treatment units, and wherein treated water in which the sulfate ion concentration has been reduced compared to the sulfate ion concentration in the treatment target water is discharged from the treatment units.

13. The system for producing magnesium chloride according to claim 2 further comprising:

a decarbonation unit that removes at least some of carbonic acid included in the treatment target water.

14. The system for producing magnesium chloride according to claim 3 further comprising:

a decarbonation unit that removes at least some of carbonic acid included in the treatment target water.

15. A system for producing magnesium comprising:

the system for producing magnesium chloride according to claim 2;

a generation unit that generates magnesium chloride by separating water from the slurry; and an electrolysis unit that obtains metal magnesium through molten salt electrolysis of the magnesium chloride.

16. A system for producing magnesium comprising:

the system for producing magnesium chloride according to claim 3;

a generation unit that generates magnesium chloride by separating water from the slurry; and an electrolysis unit that obtains metal magnesium through molten salt electrolysis of the magnesium chloride.

* * * * *